United States Patent [19]

Simonson

[11] Patent Number: 5,316,238

[45] Date of Patent: May 31, 1994

[54] CLOSED FACE FISHING REEL

[75] Inventor: Dale E. Simonson, North Mankato, Minn.

[73] Assignee: Johnson Fishing, Inc., Mankato, Minn.

[21] Appl. No.: 739,666

[22] Filed: Aug. 2, 1991

[51] Int. Cl.$^5$ .............................................. A01K 89/01
[52] U.S. Cl. ...................................... 242/234; 242/311
[58] Field of Search ................................ 242/234–240, 242/310, 311, 323, 224

[56] References Cited

U.S. PATENT DOCUMENTS

| | | | |
|---|---|---|---|
| 3,166,267 | 1/1965 | Rowe | 242/224 |
| 3,417,501 | 12/1968 | Fulope | 242/311 X |
| 3,534,919 | 10/1970 | Rowe | 242/224 |
| 3,637,157 | 1/1972 | Rowe | 242/224 |
| 4,285,476 | 8/1981 | Baenziger | 242/234 |
| 4,722,491 | 2/1988 | Myojo | 242/311 |

Primary Examiner—Joseph J. Hail, III
Attorney, Agent, or Firm—Foley & Lardner

[57] ABSTRACT

A closed face fishing reel comprises a body and a housing detachably secured to the body. The housing includes an aperture for permitting fishing line to pass through. The shape of the aperture is selectively alterable from a configuration which imparts a jerking motion to the line as it is wound into the reel to a configuration which imparts little or no jerking motion to the line as it is wound into the reel. In accordance with the preferred embodiment, the reel includes a body, a housing segment attached to the body, a cover attached to the housing segment and a rotatable member position between the housing segment and cover. The cover and member each include apertures which cooperate one with the other to define a line passageway of variable shape.

23 Claims, 3 Drawing Sheets

CLOSED FACE FISHING REEL

TECHNICAL FIELD

This application relates in general to new and useful improvements in closed face fishing reels. More particularly, this invention relates to closed face fishing reels which permit jerking or tugging of the line when the line is wound in.

BACKGROUND OF THE INVENTION

A very popular item with fishermen is the closed face fishing reel. This type of reel typically includes a body, a spool mounted to the body, and a winding drum rotatable relative to the spool. A crank and gearing mechanism permit the winding drum to be rotated. A line engaging element extending from the winding drum catches the line and winds it on the spool as the winding drum is rotated. Closed face fishing reels currently available typically include a housing secured to the reel body which encloses the spool, winding drum and gearing mechanism. The forward part of the housing includes a line passageway. The shape of the line passageway determines, at least in part, the characteristics of the discharge of line from the fishing reel when a fishing bait is cast and the characteristics of the infeed of the line as it is wound in. Conventional line passageways are circular, and thus have very little effect on the line as it is wound in.

As will be appreciated by those skilled in the art, generally this type of fishing reel is mounted on a fishing rod through a mounting leg attached to the reel body. In use, an angler uses his hand to grip the upper portion of the reel together with the fishing rod.

When the angler uses particular baits, such as those requiring movement while in the water, it is customary for the angler to "jerk" the bait (i.e., physically move the line by raising the rod tip by hand), while at the same time winding the line in. Although cumbersome, expert anglers have perfected certain techniques which, through use, have been found to promote the catching of fish. Uniform repetition is, however, difficult even for the most experienced anglers. Thus, there is a long-felt need to provide a reel configuration which permits optional automatic, repeatable jerking of the line when the line is wound in.

More particularly, there is a need to provide a closed face spinning reel design permitting a jerking or tugging motion to be imparted to the line when reeled in, such as for attracting the attention of fish, which construction is simple and which enables a variety of different line actions to be easily obtained. Additionally, there is a need to provide such a construction which permits particular line actions to be readily repeatable.

Applicant is aware of several prior attempts to accomplish this result. For example, U.S. Pat. No. 3,166,267, issued Jan. 19, 1965 to Rowe, discloses a spinning reel which purports to provide a jerking motion to a fishing line. The type of jerking action produced relates to the distance each pole is from the spool axis and to the use of a rotating pickup pin on the spool. Several embodiments are described in this patent, each of which involve the complicated use of multiple holes offset eccentrically from the spool axis for selectively positioning the line guiding means in the outer housing at different radial distances from the axis of rotation of the spool member.

In a later patent, U.S. Pat. No. 3,637,157, issued Jan. 25, 1972, Rowe provides an open faced spinning reel design which is disclosed as permitting a considerable amount of jerking or tugging to be imparted to the line when drawn in.

Other closed face fishing reel designs are shown in Fulope, U.S. Pat. No. 3,417,501, issued Dec. 24, 1968 and Myojo, U.S. Pat. No. 4,722,491, issued Feb. 2, 1988.

None of the foregoing patents, however, provide a simple and efficient closed face spinning reel which permits pulsations to be imparted to the line as it is reeled in.

SUMMARY OF THE INVENTION

The present invention involves a closed faced fishing reel of a simple construction which permits jerks or pulsations to be imparted to the line as it is reeled in. The reel is particularly useful to provide a jerking or tugging motion in the line to promote the catching of fish. How the present invention provides these benefits will become apparent shortly as the preferred embodiment thereof is described in connection with the Figures. Generally, however, the benefits are obtained by providing a closed face fishing reel with aperture defining elements, at least one of which is rotatable with respect to another, such that a variety of geometric configurations can be easily obtained to define a line passageway.

In accordance with one preferred embodiment of the invention, the closed face fishing reel comprises a body, a housing segment attached to the body, a cover attached to the housing segment, and a rotatable member positioned between the housing segment and the cover. The housing segment and rotatable member each include an aperture. The aperture in the rotatable member cooperates with the cover aperture to define a line passageway of variable dimension.

In accordance with another preferred embodiment of the invention, the closed face reel comprises a body and a housing attached to the body at one end having an annular recess in the opposite end. A disc is adapted to be received in the recess and is rotatable with respect to the housing. The housing and the disc each include an aperture. The aperture in the disc cooperates with the housing aperture to define a line passageway of variable dimension.

Also provided is a housing for use with closed face spinning reels. The housing includes a face plate which is demountably attached to the reel. A first aperture defining member is attached to the face plate, and a second aperture defining member is attached to the first aperture defining member. The first aperture defining member is rotatable with respect to the face plate and second member such that the first and second members cooperate to define a line passageway.

DETAILED DESCRIPTION OF THE PREFERRED EXEMPLARY EMBODIMENTS

Figure 1:
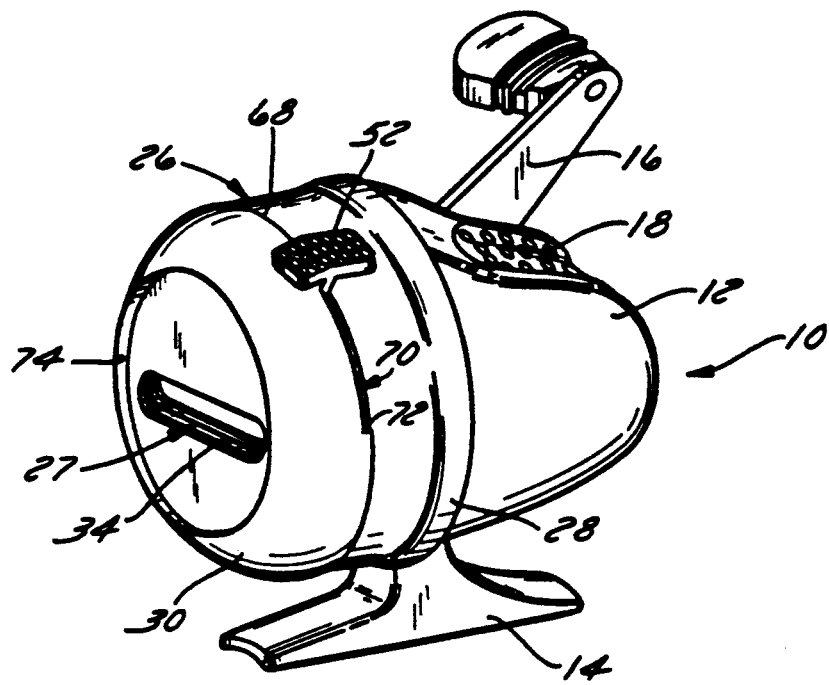
FIG. 1 is a perspective view of a preferred embodiment of the closed face fishing reel according to the invention.

A closed face fishing reel 10 according to the present invention is shown generally in FIG. 1. Reel 10 includes a body 12 to which a mounting leg 14 is suitably attached. As is known, mounting leg 14 is used to attach reel 10 to a fishing rod.

Figure 3:
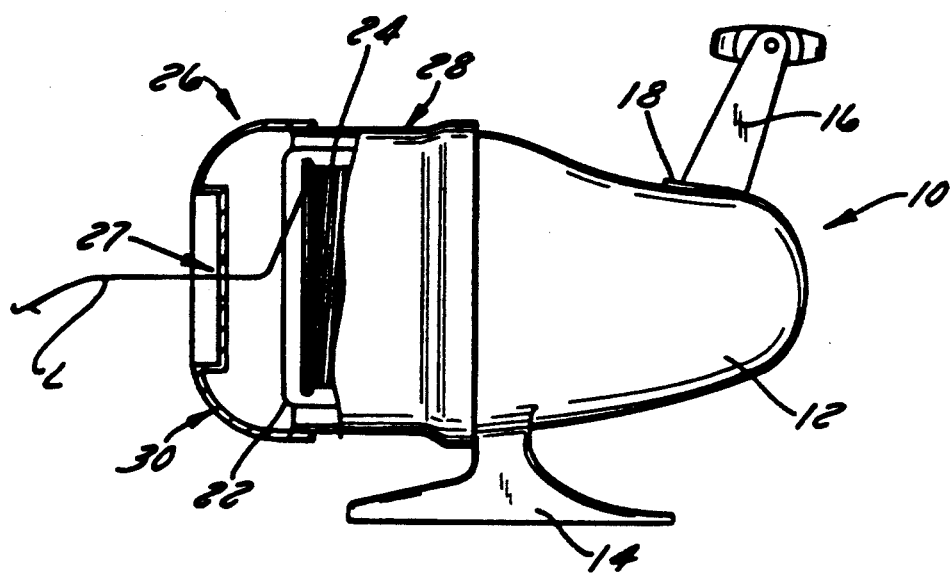
FIG. 3 is a side view, partially in section of the closed face fishing reel of FIG. 1.

With reference to FIGS. 1 and 3, a hand crank 16 is rotatably attached to body 12. With particular reference to FIG. 3, within body 12 of reel 10, a rotatably driven winding drum 22 is rotated through conventional drive means including hand crank 16. Winding drum 22 includes a conventional line engaging element (not shown). Rotation of hand crank 16 causes rotation of winding drum 22 causing the line L to be wound on a spool 24.

A push button 18 is also provided, preferably on the upper surface of body 12. As is known, when push button 18 is depressed, such as when an angler using reel 10 casts out bait, line L is let out of reel 10. In particular, when push button 18 is depressed, winding drum 22 is released such that line L can be paid out from spool 24.

Figure 2:
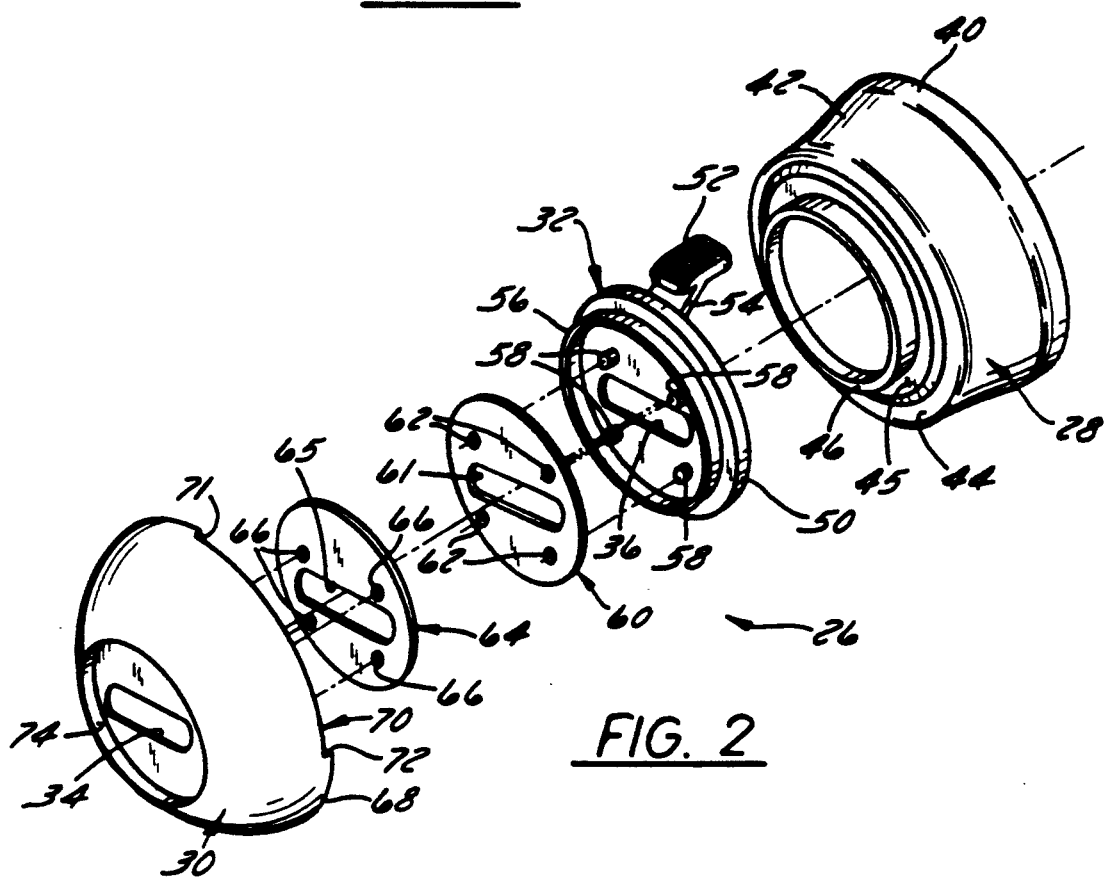
FIG. 2 is an exploded view of the closed face fishing reel of FIG. 1.

Reel 10 according to the present invention also includes a housing 26. With reference to FIG. 2, the various components of housing 26 in accordance with a preferred embodiment of the invention are shown. Preferably, housing 26 includes a first housing segment or face plate 28, a cover 30 and a rotatable aperture defining member 32 positioned between housing segment 28 and cover 30. As will be discussed more fully below, cover 30 and rotatable member 32 are each provided with respective apertures 34 and 36. Apertures 34 and 36 cooperate to define a line passageway 27 through which line L on spool 24 extends. As will be appreciated by those skilled in the art, the shape of line passageway 27 determines, at least in part, the characteristics of line L as it is wound onto spool 24.

With continued reference to FIG. 2, face plate 28 preferably includes an inside rim 40, an outside planar face 44 and a substantially dome-shaped body 42 spanning therebetween. Preferably, inside rim 40 is suitably configured to attach to body 12 of reel 10. In accordance with one preferred embodiment of the present invention, inside rim 40 is provided with suitable threading (not shown) corresponding to threading provided on body 12 (also not shown) such that face plate 28 can be screwed to body 12.

An attaching shoulder 45 extends outwardly from face 44. As will be explained more fully below, shoulder 45 is configured to receive a portion of cover 30 to suitably attach cover 30 to face plate 28.

An annular lip 46 extends outwardly from the outer surface of shoulder 45. Preferably, rotatable member 32 is suitably configured to be rotatably attached to annular lip 46 of housing segment 28. Member 32 preferably includes an annular band 50 having an outside diameter slightly larger than the inside diameter of annular lip 46. The width of band 50 preferably corresponds substantially to the width of annular lip 46. In this manner, member 32 can be snugly fit onto lip 46 such that member 32 can be positioned with respect to housing segment 28 and that position can be maintained. However, upon the application of a rotational force, member 32 can be rotated with respect to housing segment 28. In accordance with a preferred embodiment of the invention, such force is exerted on a knob 52, preferably attached to band 50 by an arm 54. As shown, knob 52 may be provided with a textured surface to facilitate engagement by an angler's finger or thumb. As will be discussed more fully below, movement of knob 52 causes movement of member 32 with respect to cover 30 and housing segment 28 to yield a desired line passageway 27.

Aperture 36 is provided in band 50. In accordance with a preferred embodiment of the present invention, aperture 36 has a substantially rectangular configuration with rounded ends and is disposed about the horizontal axis of band 50. It should be appreciated, however, that other geometric configurations, such as involute curves, trapezoidal, hourglass or oval configurations, may be useful and applicant does not limit his invention solely to the configurations shown and described herein. Moreover, other dispositions of aperture 36, such as about the vertical axis may also be useful in accordance with the present invention.

Surrounding aperture 36 are nibs 58, preferably arranged symmetrically. Nibs 58 preferably extend outwardly from the outer surface of band 50. Surrounding nibs 58 is an annular lip 56, similar to lip 46 of housing segment 28. As shown best in FIG. 2, lip 56 preferably also extends outwardly from the outer surface of band 50.

A first disc 60 including an aperture 61, preferably substantially similar to aperture 36, is optionally provided and may be secured to rotatable member 32 by passing nibs 58 through respective holes 62. Similarly, a second disc 64 including an aperture 65, preferably similar to apertures 36 and 61, may also be suitably attached to cover 30 by passing nibs (not shown) similar to nibs 58 through respective holes 66. In accordance with a preferred embodiment, discs 60 and 64 are ultrasonically staked or heat staked to the respective nibs. Discs 64 and 60 provide stability and integrity to rotatable member 32 and reinforce aperture 36 to provide a smooth line passageway when cover 30 is attached to face plate 28.

As shown best in FIG. 2, cover 30 includes an inside rim 68. A notch 70 having a first end 71 and a second end 72 is provided on rim 68. In accordance with the preferred embodiment of the invention, first end 71 is about 90 to 180 degrees from second end 72, and more preferably approximately 90 degrees from second end 72. As will be explained more fully below, first and second ends 71 and 72 limit rotation of rotatable member 32.

Preferably, cover 30 is dome-shaped and includes a front recess 74 which includes aperture 34. In accordance with the preferred embodiment of the invention, cover 30 is attached to face plate 28 by attaching inside rim 68 to shoulder 45 of face plate 28. A conventional detent locking mechanism or other suitable device may be employed to ensure that cover 30 is fixed to face plate 28 in a semi-permanent manner. In accordance with a preferred embodiment of the invention, cover 30 is ultrasonically welded to face plate 28.

Figure 4:
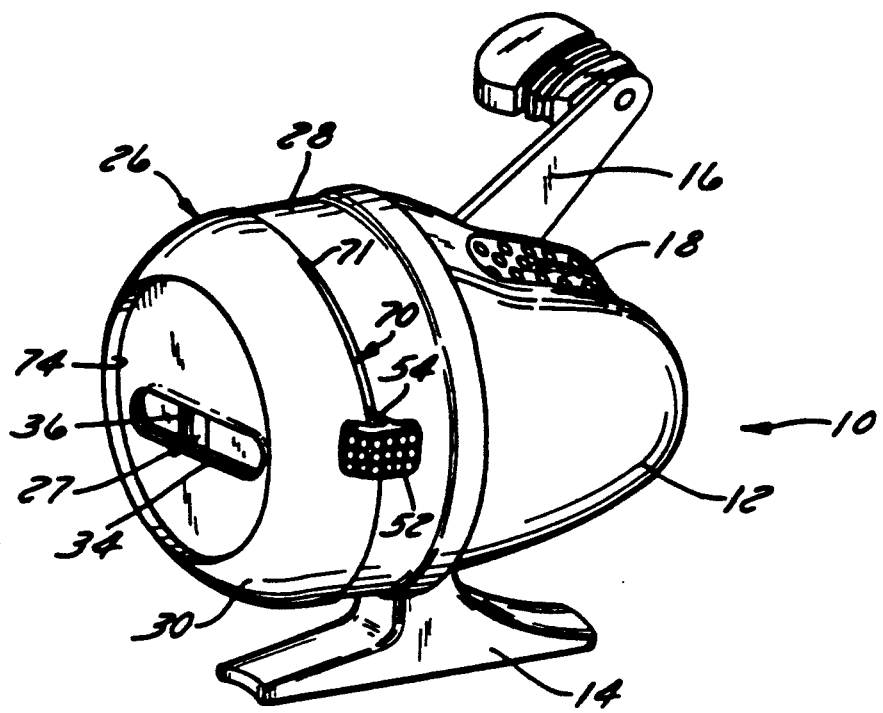
FIG. 4 is a perspective view of the closed face fishing reel according to the invention, wherein a substantially square-shaped aperture has been obtained.

As shown best in FIGS. 1, 2 and 4, when assembled, housing 26 suitably attaches to body 12 with rotatable member 32 disposed between housing segment 28 and cover 30. Arm 54 extends through notch 70 in cover 30 to locate knob 52 outside of housing segment 28 and cover 30. Knob 52 is rotatable from first end 71 of notch 70 to second end 72 to vary the shape of line passageway 27 formed by the cooperation of apertures 34 and 36. Particularly, as shown in FIG. 1, when knob 52 is abutted against first end 71, passageway 27 preferably has an oval configuration. On the other hand, as shown best in FIG. 3, when knob 52 abuts second end 72, aperture 36 is rotated with respect to aperture 34 such that line passageway 27 preferably has a substantially square-shaped configuration formed by the intersection of apertures 36 and 34.

As should be readily appreciated, a number of different line passageway configurations are obtainable with varying degrees of rotation of member 32 with respect to cover 30 and face plate 28. For example, in FIG. 4, one alternative position is shown in phantom where line passageway 27 has the shape of a parallelogram. Because member 32 is snugly disposed between face plate 28 and cover 30, as described above, each of the various available positions of member 32 may be easily maintained. Preferably, the fit is not so snug, however, as to make alterations in the shape of line passageway difficult for the angler using reel 10. In accordance with a particularly preferred embodiment of the invention, conventional detent locking means are provided such that member 32 is locked in the position with knob 52 adjacent first end 71 and in the position with knob 52 adjacent second end 72. This permits the angler to easily maintain a passageway shape which permits a jerking motion to be imparted to the line or one in which little or no such motion is imparted to the line as the line is wound in.

In operation, an angler using reel 10 chooses a particular line passageway 27 which is desired. Member 32 is rotated with respect to housing segment 28 and cover 30 by moving knob 52 within notch 70. Once a desired passageway 27 is obtained, line L may be reeled in through use of crank 16. As line is wound, pulsations are imparted to line L. In a particularly preferred embodiment of the invention, the configuration of passageway 27 imparts a tugging or jerking motion to line L as it is wound up. In the event, however, the angler wishes that the line be wound in with little or no jerking motion in line L, the angler need only rotate member 32 such that a substantially square-shaped line passageway is obtained. In this configuration, the line is wound in substantially the same manner as line is wound in using conventional reels. With reel 10, this would involve moving knob 52, such as through use of the angler's finger or thumb, to second end 72.

It should be appreciated that housing 26 may be retrofit to conventional closed face fishing reels. For example, inside rim 40 may be provided with suitable threading, a bayonet lock or other attaching means to permit housing 26 to be attached to conventional reels. In this manner, housing 26 and the easily obtained benefits it provides can be easily obtained with conventional reels.

Figure 5:
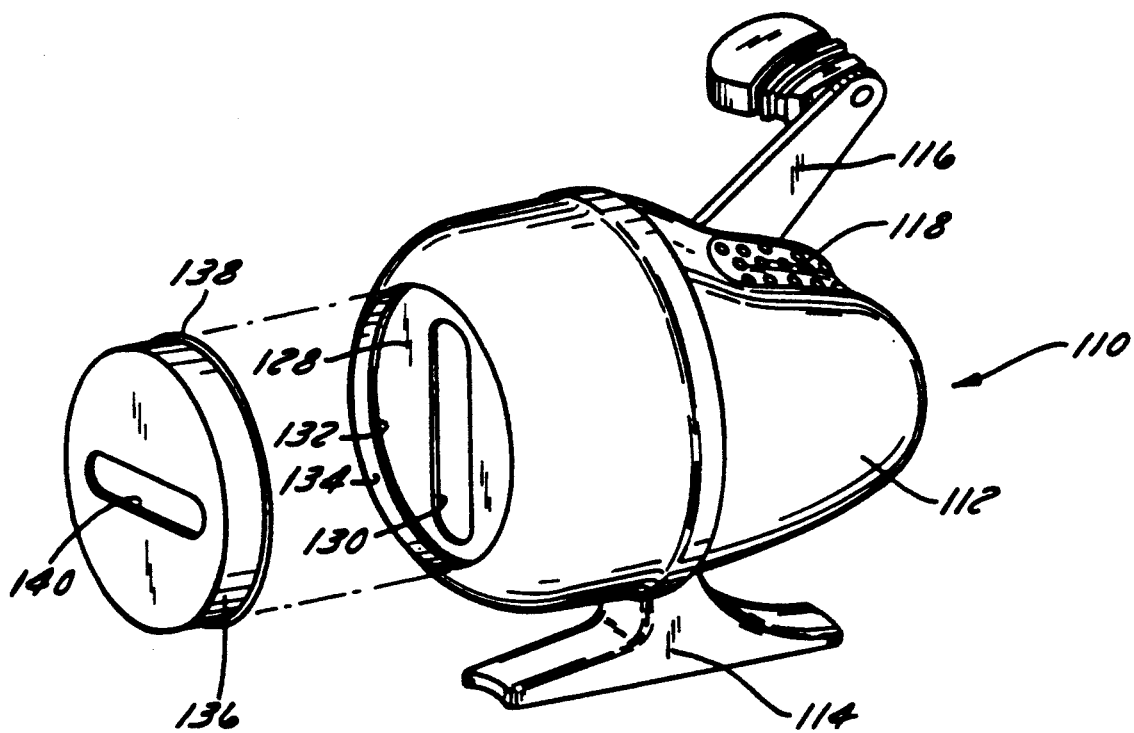
FIG. 5 is a partially exploded view of an alternative embodiment of the closed face fishing reel according to the invention.

With reference to FIG. 5, an alternative reel 110 according to the present invention is shown. Reel 110 includes a body 112 having a mounting leg 114 extending therefrom. A push button 118 is also provided on body 112 to permit line to be paid out from reel 110. A hand crank 116 is suitably attached to body 112 to permit line to be wound on reel 110.

A housing 126 is suitably attached to body 112, preferably by appropriate threads (not shown) being provided on body 112 and the interior portion of housing 126. Preferably, housing 126 is dome-shaped and includes an annular recess 128 on its outermost surface. Recess 128 preferably includes an inner groove 132 and an annular rim 134. As shown, annular recess 128 includes an aperture 130, preferably having an oval configuration.

A circular shaped disc 136 is adapted to be received within recess 128. Preferably, the diameter of disc 136 is substantially similar to the diameter of recess 128. Disc 136 includes a circumferential bead 138 which, when disc 136 is inserted into recess 128, fits within groove 132 to lock disc 136 into recess 128.

Disc 136 also includes an aperture 140, preferably having an oval configuration substantially similar to aperture 130. When disc 136 is locked into recess 128, disc 136 is rotatable with respect to housing 126 such that apertures 130 and 140 cooperate to define a line passageway of varying shape.

An angler using reel 110 according to the present invention simply chooses the desired passageway, rotates disc 136 with respect to housing 126 to obtain that passageway and then reels line in using crank 116. The selected configuration of the passageway may then provide a jerking or tugging motion to the line. Alternatively, in the event the angler does not want pulsations to be imparted to the line as it is wound in, disc 136 can be oriented with respect to housing 126 such that a substantially circular configuration is obtained.

It will be understood that while various specific configurations of the closed face fishing reel according to the invention have been described herein, they have not been described in a limiting sense and the fishing reel according to the invention is not limited to the specific forms shown. Various modifications in the precise configuration of the components of the closed faced reel of the invention and the relationship between the various components thereof may be made as are now known or hereafter devised by those of ordinary skill in the art. For example, the geometric configuration of the apertures cooperating to define a line passageway may be varied, the disposition of the apertures may be changed, or the housing construction may be altered as desired. Numerous other modifications may also be made in the design and arrangement of the elements within the scope of the invention, as is expressed in the claims appended hereto.

I claim:

1. A closed face fishing real comprising:
   a body, including a spool and winding drum for winding line onto said spool;
   a housing detachably secured to said body, said housing having an aperture for permitting said line to pass through; and
   means for selectively altering the shape of said aperture, whereby the shape of said aperture may be selected from a continuum of shapes, wherein said continuum of shapes ranges from a shape which imparts substantially little or no jerking motion to the line to a shape which imparts considerable jerking motion to the line.

2. A closed face fishing reel comprising:
   a body;
   a housing segment attached to said body;
   a cover attached to said housing segment and including an aperture; and
   a rotatable member positioned between said housing segment and said cover, said member having a second aperture which cooperates with said cover aperture to define a third aperture of variable shape.

3. The fishing reel of claim 2, wherein said rotatable member includes an adjustment knob.

4. The fishing reel of claim 3, wherein said rotatable member is rotatable with respect to said housing segment and said cover about an arc of about 90°.

5. The fishing reel of claim 4, wherein said cover includes a forward dome-like surface terminating in a circular rim, said rim including a notch about its circumference to limit rotation of said rotatable member.

6. The fishing reel of claim 2, wherein said cover includes an annular recess in the outermost portion of said cover.

7. The fishing reel of claim 6, wherein said cover aperture is in said annular recess.

8. The fishing reel of claim 2, further comprising at least one aperture defining plate affixed to said rotatable member, and at least one aperture defining plate affixed to said cover.

9. A closed face fishing reel comprising:
a body;
a housing segment attached to said body;
a cover attached to said housing segment and including an aperture; and
a rotatable member positioned between said housing segment and said cover, said member including an aperture which cooperates with said cover aperture to define a line passageway of variable shape, wherein said cover aperture has a rectangular configuration with rounded ends.

10. The fishing reel of claim 9, wherein said rotatable member aperture has a rectangular configuration with rounded ends.

11. A closed face fishing reel optionally enabling pulsations to be imparted to line as it is wounded into the reel, said reel comprising:
a body;
a housing having first and second ends, said first end being releasably attached to said body, said second end including a recess having a first aperture;
a disc adapted to be rotatably received in said recess, said disc including a second aperture;
wherein said first and second apertures cooperate to define a third aperture of variable shape.

12. The reel of claim 11, wherein said recess includes an inner groove and said disc includes a circumferential bead, said bead engageable with said groove to rotatably secure said disc within said recess.

13. A housing for use with a closed face spinning reel, said housing comprising:
a face place demountably attached to the reel;
a first aperture defining member attached to said face plate;
a second aperture defining member attached to said face plate;
wherein said first aperture defining member is rotatable with respect to said face plate and said second aperture defining member, said first and second members cooperating to define a third aperture of variable shape.

14. The housing of claim 13, further comprising at least one aperture defining disc attached to said first aperture defining member.

15. The housing of claim 13, wherein said second aperture defining member comprises a substantially dome-shaped housing.

16. A housing for use with a closed face spinning reel, said housing comprising:
a face place demountably attached to the reel;
a first aperture defining member attached to said face plate;
a second aperture defining member attached to said face plate;
wherein said first aperture defining member is rotatable with respect to said face plate and said second aperture defining member, said first and second members cooperating to define a line passageway, wherein said line passage aperture is variable from a substantially square-shaped configuration to a substantially rectangular configuration.

17. A housing for use with a closed face spinning reel, said housing comprising:
a face place demountably attached to the reel;
a first aperture defining member attached to said face plate;
a second aperture defining member attached to said face plate;
wherein said first aperture defining member is rotatable with respect to said face plate and said second aperture defining member, said first and second members cooperating to define a line passageway, wherein said first and second aperture defining members include slots of substantially similar dimensions.

18. The housing of claim 17, wherein said slots are rounded rectangles.

19. A closed face fishing reel of the type wherein a winding drum driven by a crank winds line onto a spool, said winding drum and said spool carried by a body and covered by a housing, said housing including a housing aperture and being releasably attached to said body, wherein the improvement comprises:
a rotatable member having a first aperture disposed within said housing,
said first aperture cooperating with said housing aperture to form a geometric configuration which imparts pulsations to said line as it is wound onto said spool.

20. A closed face fishing reel of the type wherein a winding drum driven by a crank winds line onto a spool, said winding drum and said spool carried by a body and covered by a housing, said housing including a line passageway and being releasably attached to said body, wherein the improvement comprises a rotatable member having a first aperture disposed within said housing, said first aperture cooperating with said line passageway to form a geometric configuration which optionally imparts pulsations to said line as it is wound onto said spool, wherein said first aperture and said line passageway define a substantially rectangular configuration.

21. A closed face fishing reel comprising:
a body;
a housing attached to said body;
a first aperture defining member attached to said housing; and
a second aperture defining member movably disposed relative to said first aperture defining member, wherein said first and second aperture defining members cooperate to define an aperture of variable shape, wherein the shape of the aperture defined by said first and second aperture defining members is altered when second aperture defining member is moved relative to said first aperture defining member.

22. The closed face fishing reel of claim 21 further comprising a spool having an axis of rotation, said spool being removably attached to said body and encompassed in said housing, said aperture of variable shape being substantially coaxial with said axis of rotation.

23. A closed face fishing reel comprising:
a body;
a housing attached to said body, said housing having a aperture, said aperture having a variable shape selectable by a user; and
a spool having an axis of rotation, said spool being removably attached to said body and encompassed in said housing, said first aperture being substantially coaxial with said axis of rotation;
a first aperture defining member attached to said housing; and
a second aperture defining member movably disposed relative to said first aperture defining member, wherein said first and second aperture defining members cooperate to define said aperture;
wherein the shape of said aperture is selected by moving said second aperture defining member relative to said first aperture defining member.

* * * * *